United States Patent [19]

Tamaoki et al.

[11] Patent Number: 5,002,440
[45] Date of Patent: Mar. 26, 1991

[54] APPARATUS FOR AUTOMATICALLY STOPPING OPERATION OF CUTTING MACHINE

[75] Inventors: Eiki Tamaoki, Habikino; Makoto Sakaguchi, Ikoma; Norio Usui, Osaka, all of Japan

[73] Assignee: Rex Industries Co., Ltd., Osaka, Japan

[21] Appl. No.: 297,600

[22] Filed: Jan. 17, 1989

[30] Foreign Application Priority Data

Jan. 21, 1988 [JP] Japan .................. 63-009642

[51] Int. Cl.⁵ .............................................. B23G 5/12
[52] U.S. Cl. ...................................... 408/12; 10/94; 10/120; 408/15; 408/73; 408/148
[58] Field of Search ................ 29/27 C; 408/8, 9, 11, 408/14, 15, 12, 73, 148, 149; 10/89 H, 107 R, 111, 96 R, 94, 120

[56] References Cited

U.S. PATENT DOCUMENTS

| | | | |
|---|---|---|---|
| 3,427,672 | 2/1969 | Frank | 408/14 |
| 3,516,327 | 6/1970 | Wilson | 408/14 |
| 3,545,310 | 12/1970 | Porath et al. | 408/11 |
| 4,025,219 | 5/1977 | Baumann et al. | 408/14 |
| 4,288,181 | 9/1981 | Sakaguchi et al. | 408/15 |
| 4,329,093 | 5/1982 | Maruyama | 408/15 |
| 4,604,006 | 8/1986 | Shoji et al. | 408/11 |

FOREIGN PATENT DOCUMENTS 56-146620 11/1981 Japan .
57-15628 1/1982 Japan .
59-100527 7/1984 Japan .

*Primary Examiner*—Daniel W. Howell
*Attorney, Agent, or Firm*—Merchant, Gould, Smith, Edell, Welter & Schmidt

[57] ABSTRACT

In a cutting machine having a spindle drive motor, a die head which holds at least one cutting tool, and an automatic tool retracting means on the die head for detecting the completion of the cutting operation of a pipe to be cut by the cutting tool to automatically retract the cutting tool to its inoperative position, an automatic operation stopping apparatus including a detecting unit for detecting the operation of the automatic tool retracting unit and a switch for automatically breaking the electrical connection of the spindle drive motor in response to the detection by the detecting unit.

11 Claims, 9 Drawing Sheets

APPARATUS FOR AUTOMATICALLY STOPPING OPERATION OF CUTTING MACHINE

BACKGROUND OF THE INVENTION

1. Technical Field of the Invention

The present invention relates to an apparatus for automatically detecting the completion of a cutting operation of a cutting machine, to stop the rotation of a spindle driving motor thereof.

2. Description of the Related Art

Cutting machines such as a thread cutting machine having an automatic tool retracting device which detects the completion of the cutting to automatically return or retract a cutting tool to an inoperative position are known.

The assignee of the present application has proposed prior Japanese applications directed to die heads having an automatic tool retracting device, as mentioned above (e.g., Japanese Unexamined Utility Model Publication No. 59-100527, Japanese Unexamined Patent Publication Nos. 56-146620 and 57-15628).

The tool retracting device usually includes a tool retracting lever having a front end which lies in the center of a center opening of a die head so as to come into contact with a leading end of a pipe to be cut, which is axially extended in the die head when the pipe comes to a predetermined cutting completion position, so that the tool retracting lever can be moved by the pipe when the pipe is brought into the contact with the tool retracting lever and automatically and rapidly retract or return the tool (or tools) to its (or their) initial position (inoperative position) by means of a scroll mechanism provided in the die head.

With the tool retracting device, it is not necessary for an operator to continuously stand by the machine to observe the ending of the cutting operation. In addition, the tool retracting device contributes to the formation of a good appearance of the cut surface of the pipe.

In the prior art as mentioned above, however, the tool retracting operation is achieved by returning the tool(s) to the initial inoperative position. Namely, the concept of automatically stopping the spindle driving motor in accordance with the stoppage of the completion of the tool retraction is not suggested by this prior art. In other words, although the tool(s) are automatically retracted by the automatic tool retracting device, the motor continues to rotate until the operator turns the motor OFF. This is disadvantageous from the view points of a safe operation and a lowering of electrical power consumption.

SUMMARY OF THE INVENTION

Therefore, the primary object of the present invention is to provide an automatic operation stopping apparatus for automatically stopping the rotation of the spindle drive motor at the same time as the retraction of the cutting tool(s) in a cutting machine having an automatic tool retracting device.

To achieve the above object, in a cutting machine having a spindle drive motor, a die head which holds at least one cutting tool, and an automatic tool retracting means on the die head for detecting the completion of the cutting operation of a subject to be cut by the cutting tool, to automatically retract the cutting tool to its initial inoperative position, according to the present invention, a circuit is provided comprising a detecting means for directly or indirectly detecting the operation of the automatic tool retracting means and a switch for automatically breaking the electrical connection of the spindle drive motor in response to the detection signal from the detecting means.

With this arrangement, when the automatic tool retracting device operates at the completion of the cutting operation, the operation is detected by the detecting means, and a detection signal is fed to the switch to open the switch and break the electrical connection of a drive circuit of the spindle driving motor, and as a result, the drive motor automatically stops rotating.

BRIEF DESCRIPTION OF THE DRAWINGS

The invention will be described below in detail with reference to the accompanying drawings, in which.

DESCRIPTION OF THE PREFERRED EMBODIMENTS

Figure 8:
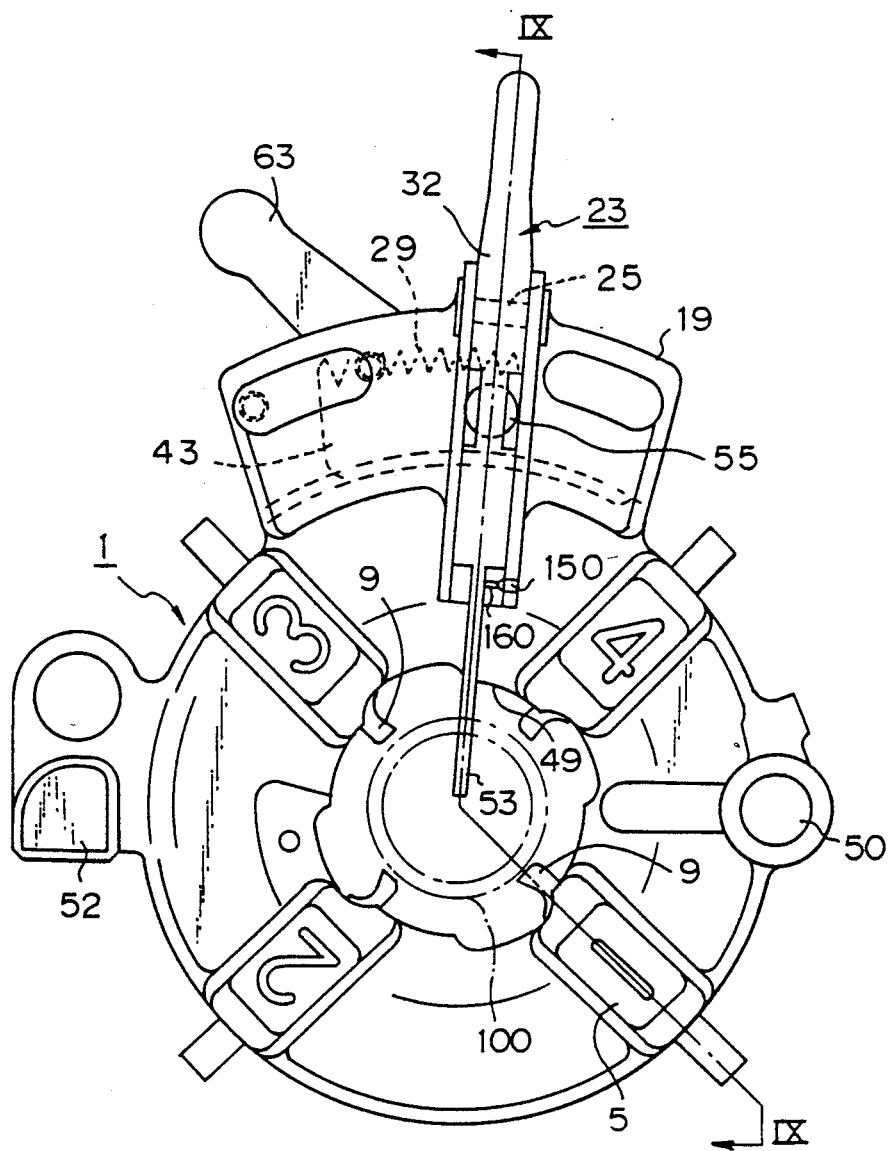
FIG. 8 is a front elevational view of a die head having an automatic tool retracting device to which the present invention is applied.
Figure 9:
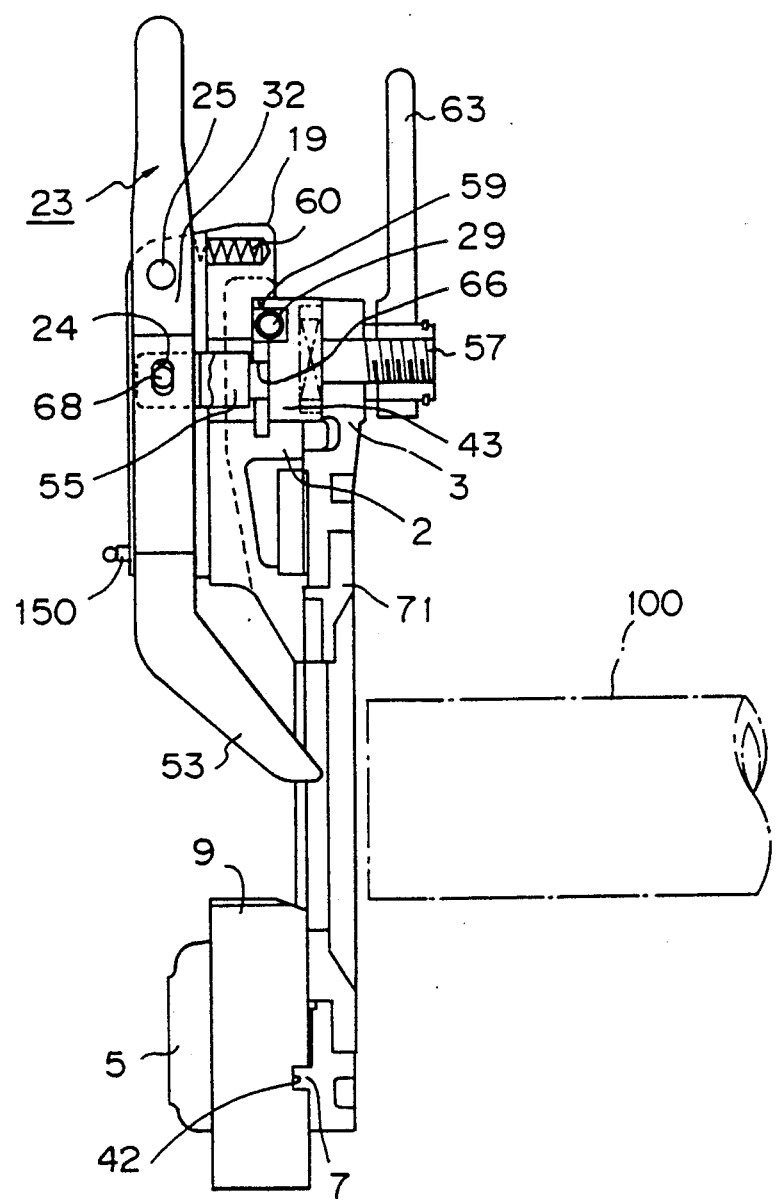
FIG. 9 is a sectional side view of FIG. 8.
Figure 10:
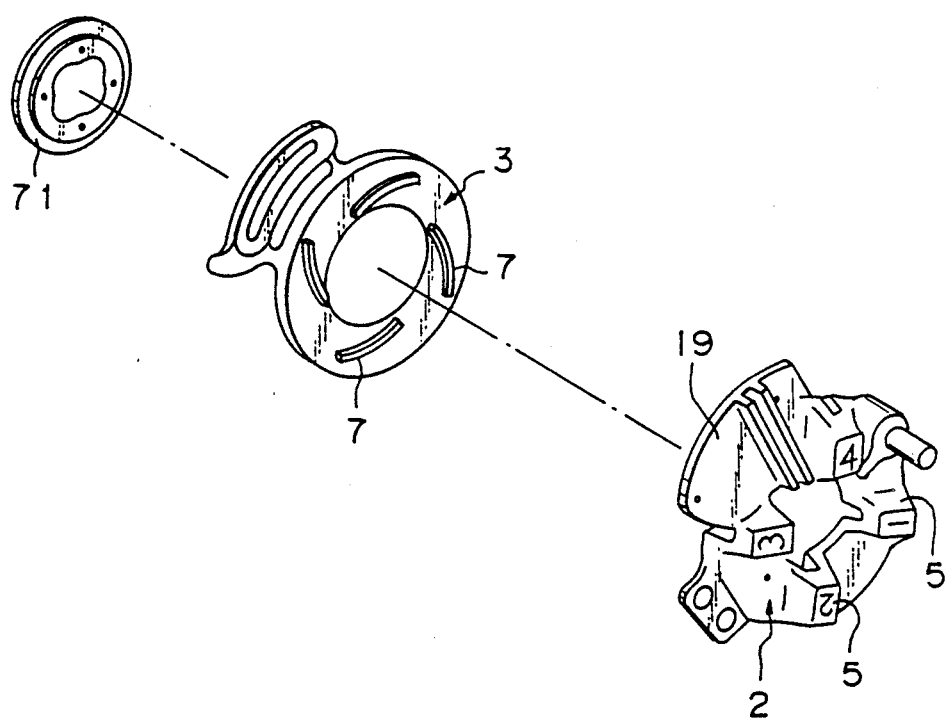
FIG. 10 is a exploded perspective view of main elements of a die head shown in FIG. 8.

The following description will be first directed to FIGS. 8 to 10, which show a cutting machine having an automatic tool retracting device which is used in the present invention by way of an example. The basic construction of the machine shown in FIGS. 8 to 10 is substantially the same as that disclosed in the above-mentioned Japanese Unexamined Utility Model Publication No. 59-100527. Note that the subject of the present invention is directed neither to the construction of the die head itself nor to the automatic tool retracting device (lever), and accordingly, the die head and the automatic tool retracting device used in the present invention are not limited to those illustrated in FIGS. 8 to 10.

The die head shown in FIGS. 8 to 10 holds four cutting tools 9, such as chasers or bitting tools, in a concentric arrangement. Essentially, it is sufficient to provide only one cutting tool. The die head body 1 is held on and by a carriage 101 (FIG. 2) of a cutting machine. The carriage 101 reciprocally moves along and on a pair of guide rods 103 (FIG. 2) which extend in parallel with an axis of a subject to be cut, such as a pipe 100. The die head body 1 is mounted to the carriage 101 so as to rotate about an axis of a mounting shaft 50 formed on a plate 2, which will be described hereinafter, between an operative position shown in FIG. 8 and a waiting position in which the die head body is rotated about the axis of the mounting shaft 50 by about 90 to 100° in the clockwise direction, from the operative position of FIG. 8.

The die head body 1 has a pair of opposed substantially annular plates 2 and 3 rotatable relative to each other. For example, the plate 3 has curved projections 7, the number of which corresponds to that of the cutting tools 9, and accordingly, is four in the illustrated embodiment. On the other hand, the plate 2 carries the cutting tools 9 which have curved grooves 42 (FIG. 9) corresponding to the curved projections 7. The cutting tools 9 are held in associated holding portions 5 of the plate 2, and thus, when a relative rotation takes place between the two plates 2 and 3, the cutting tools 9 are moved in the radial directions with the help of the curved grooves 42 and the corresponding curved projections 7 fitted therein. The scroll mechanism, as mentioned above, having the curved grooves and the curved projections for moving the cutting tools in the radial directions is well known and is widely used in cutting machines.

The radial positions of the cutting tools 9 can be adjusted by the relative rotation of the plates 2 and 3.

The plate 2 is provided on its outer periphery with a supporting portion 19 which projects outward therefrom. A tool retracting lever 23 is pivoted to the supporting portion 19 through a pivot pin 25 connected thereto, so that the tool retracting lever 23 can rotate about the pivot pin 25. The tool retracting lever 23 is continuously biased in the counterclockwise direction in FIG. 9, toward the initial position shown in FIG. 9, by a return spring 60 provided between the tool retracting lever 23 and the plate 2.

Between the plates 2 and 3 is provided a circumferential spring 29, which applies a circumferential force to the plates 2 and 3, so that the plates 2 and 3 tend to rotate relative to each other.

The plate 3 is rotatably supported by an inner ring plate 71 which is integrally connected to the plate 2 by a set screw (not shown) or the like, so that the plate 3 can rotate while being held between the plate 2 and the ring plate 71. The tool retracting lever 23 has an outer end (upper end) in the form of a handle 51 which can be used to manually operate the tool retracting lever 23 in order to retract or return the cutting tools 9 to the initial inoperative positions. Namely, when a manual retraction of the cutting tools 9 is necessary, the operator grasps the handle 51 to rotate the tool retracting lever 23 in the clockwise direction in FIG. 9. Such a manual retraction of the cutting tools is effective, for example, when the cutting tools 9, after entering the pipe 100, must be rapidly released from the pipe for some reason.

The plate 3 has a slide 43 rigidly connected thereto by a bolt 57. The slide 43 is slidable in a circumferential guide groove 59 which is formed in the plate 2 in the circumferential direction. The plate 3 and the slide 43 can be integrally interconnected by fastening the bolt 57 with the help of a lever 63 connected to the bolt 57.

More precisely, the circumferential spring 29 is provided between the slide 43 and the plate 2. The slide 43 has a hole or recess 66 in which a stop pin 55, which is connected to the tool retracting lever 23 by a pin 68, is disengageably engaged. When the stop pin 55 is engaged in the recess 66 of the slide 43, a relative movement cannot occur between the slide 43, and accordingly the plate 3 and the plate 2, against the spring 29. On the other hand, when the stop pin 55 is disengaged from the recess 66 of the slide 43, the slide 43 can be rotated together with the plate 3 relative to the plate 2 by the spring force of the spring 29. The stop pin 55 can be disengaged from the recess 66 of the slide 43 when the tool retracting lever 23 rotates about the pin 25 in the clockwise direction in FIG. 9, to move the stop pin in the left hand direction in FIG. 9. The tool retracting lever 23 has an elongated hole 24 formed therein in which the pin 68 is fitted, so that the rotational movement of the lever 23 is smoothly converted to the linear movement of the stop pin 55.

The free end 53 of the tool retracting lever 23 projects into the center opening of the annular plates 2 and 3 so as to come into contact with the leading end of the pipe 100.

Figure 2:
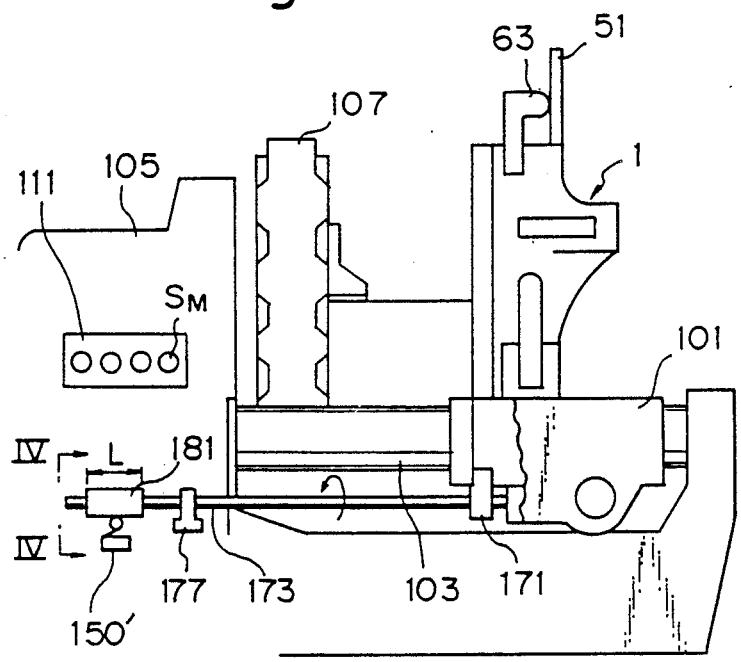
FIG. 2 is a view showing an appearance of a main part of a cutting machine in which an automatic operation stopping apparatus according to the present invention is incorporated.

When the pipe 100 comes close to the end of the cutting operation, such as a thread cutting operation by the cutting tools 9, the pipe 100 begins to come into abutment with the lower end 53 of the tool retracting lever 23 or the vicinity thereof, so that the tool retracting lever 23 is gradually moved in the left hand direction in FIG. 9, and as a result, the tool retracting lever 23 is rotated about the pin 25 in the clockwise direction in FIG. 2.

The rotation of the tool retracting lever 23 causes the stop pin 55 to disengage from the recess 66 of the slide 43, and as a result, the plate 3 is largely rotated by the spring force of the spring 29 and the cutting torque with respect to the plate 2, resulting in a rapid retraction of the cutting tools in the radial directions toward the initial inoperative positions. This completes the cutting operation.

Namely, when the machining of the pipe is completed, the cutting tools can be automatically and rapidly retracted to the inoperative positions.

FIG. 2 shows, by way of an example, a cutting machine in which an automatic operation stopping apparatus according to the present invention is incorporated.

In FIG. 2, the die head body 1 (note: the contour of the die head body 1 is roughly sketched in FIG. 2, and accordingly, is not exactly identical to that shown in FIGS. 8 to 10) is pivoted to the carriage 101 through the mounting shaft 50 (FIG. 8), as mentioned before. The carriage 101 can move along and on a pair of parallel guide rods 103 in the axial direction of the pipe 100. In FIG. 2, numerals 105 and 107 designate the machine body and the chuck device of the pipe 100, respectively. A spindle driving motor M (FIG. 1) for rotating the pipe 100 is incorporated in the machine body 105. Numeral 111 designates a switch box, which will be described hereinafter.

In the cutting machine of the kind mentioned above, the cutting tools 9 can be automatically and rapidly retracted to the respective inoperative positions by the tool retracting lever 23 at the end of the cutting operations, as mentioned before, but the spindle drive motor M continues to rotate after the retraction of the cutting tools 9. According to the present invention, an automatic operation stopping circuit is provided to automatically break a motor drive circuit of the motor M, directly or indirectly, in response to the operation of the tool retracting means (tool retracting lever 23, etc.).

Figure 1:
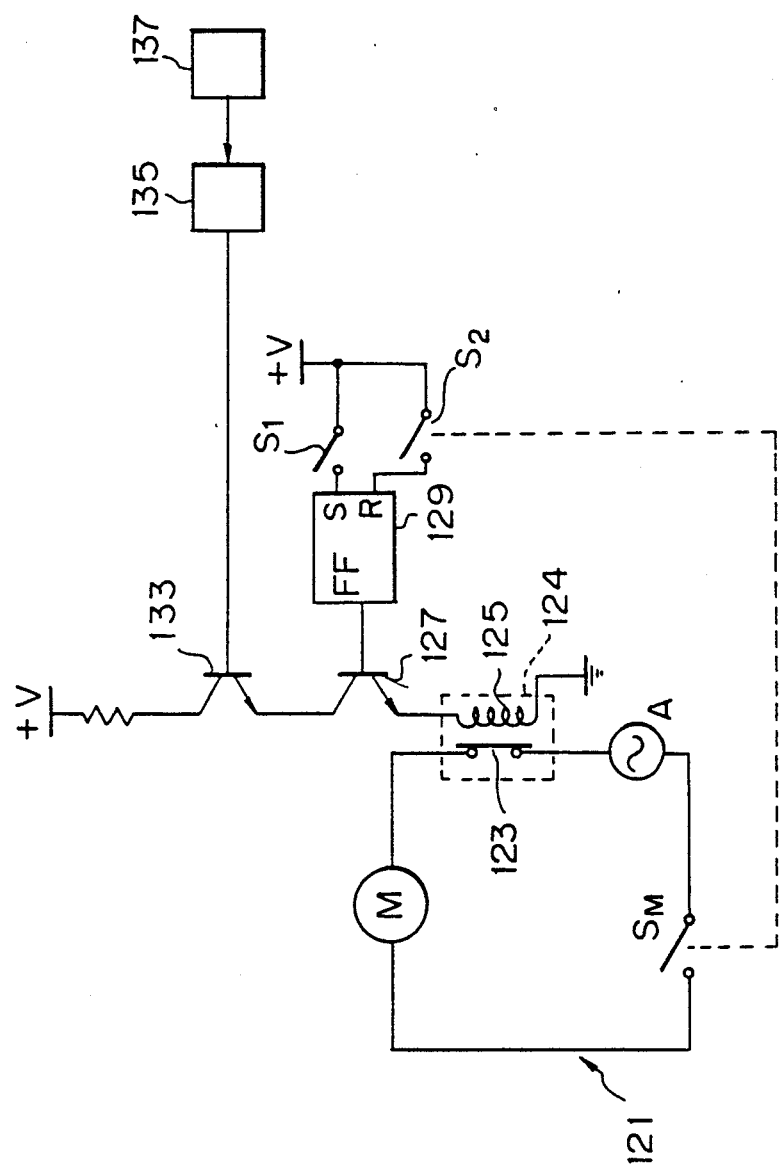
FIG. 1 is a schematic view of an automatic operation stopping circuit according to one aspect of the present invention.

FIG. 1 shows an embodiment of the automatic operation stopping circuit according to the present invention.

In FIG. 1, the motor drive circuit 121 of the motor M is essentially comprised of a power source A and a power switch $S_M$ in the switch box 111. When the power switch $S_M$ is made ON, the spindle drive motor M begins to rotate. Therefore, the object of the present invention can be achieved by providing a means for automatically breaking the motor drive circuit 121 only when the cutting operation is completed.

According to one embodiment of the present invention, the motor drive circuit 121 has a relay 124 having a relay coil 125 and a relay contact 123. The relay 124 is activated to open the normally closed relay contact 123 provided in the motor drive circuit 121. The relay 125 is controlled by a flip-flop (FF) 129 through a first transistor 127. The set terminal S of the FF 129 is connected to a first switch (e.g., microswitch) $S_1$, so that when the switch $S_1$ is made ON, the voltage $+V$ is supplied thereto. The reset terminal R of the FF 129 is supplied with the voltage $+V$ through a second switch $S_2$. The FF 129 holds the ON state of the microswitch $S_1$, as will be discussed hereinafter.

The second switch $S_2$ operates in association with the power switch (main switch) $S_M$, so that whenever the power switch $S_M$ is activated (i.e., is made ON), the FF 129 is reset.

The collector of the first transistor 127 is connected to an emitter of a second transistor 133, and the base voltage of the second transistor 133 is controlled by a photosensor (light sensor) 137 through a photoelectric converter 135. The provision of the second transistor 133, the photoelectric converter 135, and the photosensor 137 are necessary only when a function for discriminating the kinds of cutting operations, such as thread cutting, reaming, and cutting, etc., is additionally provided. If only one kind of cutting operation is needed, the voltage $+V$ can be directly applied to the collector of the first transistor 127.

With the automatic operation stopping circuit, when the power switch $S_M$ is made ON at the commencement of the cutting operation, the FF 129 is reset, so that the automatic operation stopping circuit is ready for operation. During the normal operation, the spindle drive motor M rotates to rotate the pipe 100. Once the cutting tools 9 enter the pipe 100, the die head body 1, and accordingly the carriage 101, are automatically moved in the axial direction of the pipe 100 by the lead of the thread or the like to form a predetermined length of thread on the end of the pipe 100. When the thread cutting operation approaches completion, as mentioned before, the leading end of the pipe 100 begins to push against the lower end 53 of the tool retracting lever 23, so that the stop pin 55 is disengaged from the recess 66 of the slide 43 at the completion of the cutting. The first switch $S_1$ is closed in response to the completion of the retraction of the tool retracting lever 23, to set the FF 129 and operate the relay 124 through the transistor 127, whereby the relay contact 123 is opened. As a result, the motor drive circuit 121 is broken and rotation of the motor M is stopped.

If the automatic operation stopping function is required for only a specific cutting operation, i.e., if the motor M is to be automatically stopped only for a specific cutting operation, for example, the thread cutting operation, the kind of cutting operation is detected by the photosensor 137, so that the detection signal is converted to an electrical signal by the photoelectric converter 135 to control the second transistor 133. As a result, so long as the second transistor 133 is not operative, the automatic operation stopping circuit shown in FIG. 1 is inoperative, and accordingly, the automatic operation stopping function is effective only for the thread cutting.

The actuator for the first switch $S_1$, namely the means for detecting the completion of the tool retraction lever, will be described below.

The means for detecting the completion of the tool retraction can be realized by various concepts. Essentially, the detecting means can be of any type which detects the displacement of the tool retracting lever or other members moving in association with the tool retracting lever. In its simplest form, the tool retracting lever 23 directly operates the microswitch $S_1$. Namely, as can be seen from FIGS. 8 and 9, the tool retracting lever 23 has a dog 160 which can operate the microswitch 150 (corresponding to the switch $S_1$ of FIG. 1) provided on the plate 3 corresponding to the dog 160, so that when the tool retracting lever 23 rotates about the pin 25 at the completion of the tool retraction, the tool retraction lever 23 operates the microswitch 150 to make the same ON. This ON state is held by the flip-flop 129. When the microswitch 150 (first switch $S_1$) is made ON, the motor drive circuit 121 of the motor M is broken by the relay 124.

Figure 3:
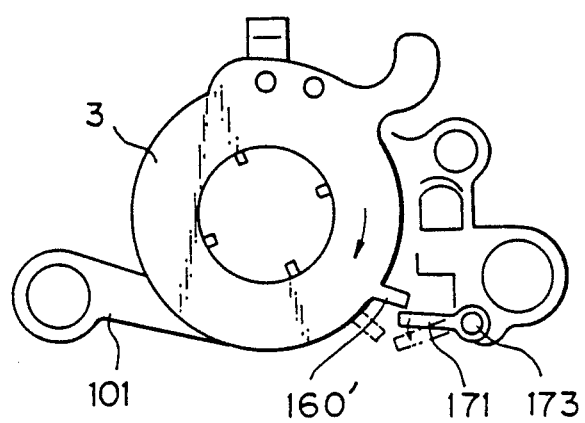
FIG. 3 is a partial end view of a cutting machine shown in FIG. 2.
Figure 4:
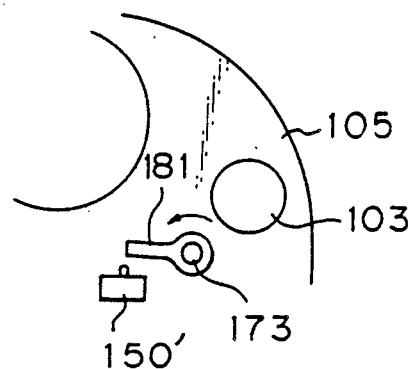
FIG. 4 is a view taken along the lines IV—IV in FIG. 2.

Alternatively, it is also possible to provide a dog 160' on the plate 3 which moves together with the tool retracting lever 23, instead of directly on the tool retracting lever 23. (Note that the plate 3 can be rotated relative to the plate 2 by the spring 29 in an unlocked position of the stop pin 55 in which the stop pin 55 is disengaged from the slide 23, as mentioned before.) This alternative is shown in FIGS. 2 to 4, in which the plate 3 has a dog 160' provided on the periphery thereof. The carriage 101 has a first lever 171 thereon which is actuated by the dog 160' and which is connected to a shaft 173. The shaft 173, which extends in a direction parallel with the axes of the guide rods 103, is rotatably supported at one end by the carriage 101 and rotatably and slidably supported at the other end (free end) by a bearing 177 provided on the machine body 105. Note, the die head 1 moves in the axial direction together with the carriage 101, as mentioned before. The shaft 173 is provided, on its free end or the vicinity thereof, with a predetermined length of second lever 181 connected thereto so as to rotate together with the shaft 173. Below the second lever 181 is provided a microswitch 150' on the machine body (headstock) 105. The axial length L (FIG. 2) of the second lever 181 is such that it covers the operable area of the microswitch 150' within a moving range in which the shaft 173 moves together with the carriage 101.

Alternatively, it is also possible to connect the second lever 181 to the shaft 173 by a spline connection so as to move relatively in the axial direction of the shaft 173 and to rotate together with the shaft 173. The provision is also made of means (not shown) for restricting the axial displacement of the second lever 181, so that the second lever 181 can not move in the axial direction of the shaft 173. This means that the axial length (width) L of the second lever 181 can be decreased to a value such that it will come into contact with the microswitch 150'.

In the embodiment illustrated in FIGS. 2 to 4, the rotation of the plate 3 is transmitted to the microswitch 150' through the dog 160', the first lever 171, the shaft 173, and the second lever 181. In this embodiment, since the microswitch 150, is provided on the machine body, no electrical wiring appears outside (Note that an electrical conductor for connecting the microswitch 150 on the die head body side to the motor drive circuit on the machine body side appears in the first embodiment mentioned before).

Also, the embodiment illustrated in FIGS. 2 to 4 is particularly useful for a type of a tool retracting means having no tool retracting lever. Such a tool retracting means using no tool retracting lever is known, for example, a tool retracting device having a template with an inclined cam surface (not shown). In this alternative, a part of the plate 3 (or plate 2) is projected outward as an arm with a roller which rolls on the inclined cam surface of the template in accordance with the axial movement of the die head to gradually rotate the plate 3 relative to the plate 2. In this type of tool retracting means, since no tool retracting lever exits, the rotation of the plate 3 can be directly used to actuate the microswitch.

Note that the embodiment illustrated in FIGS. 2 to 4 would be equivalent to the first embodiment if the first lever 173 is replaced with the microswitch, so that the first lever 171, the shaft 173, and the second lever 181 all can be omitted.

Figure 5:
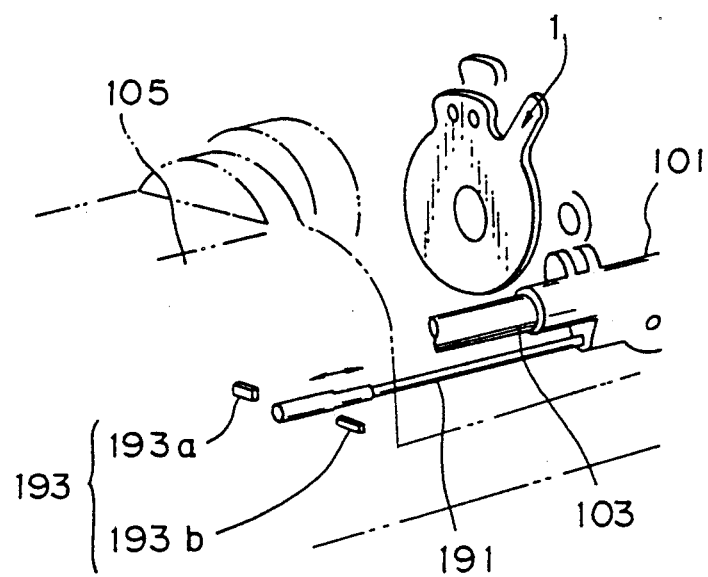
FIG. 5 is a perspective view of a modified embodiment of FIG. 2.

FIG. 5 shows another embodiment of the retraction detecting means in which a photodetector is used. Namely, the carriage 101 has a shaft 191 integral therewith which extends in parallel with the guide rods 103. When the front end of the shaft 191 intercepts the photodetector 193 (a photo-emitter 193a and a photo-receiver 193b), the completion of the cutting is detected. Namely, since the axial displacement of the carriage 101 corresponds to the axial length of the thread to be cut on the pipe 100, the detection of the axial displacement of the carriage 101 means the detection of the completion of the cutting operation. In this embodiment, a proper photoelectric switch can be used in place in the microswitch S₁ in FIG. 1. The photodetector 193 is provided, for example, on the machine body 105.

Figure 11A:
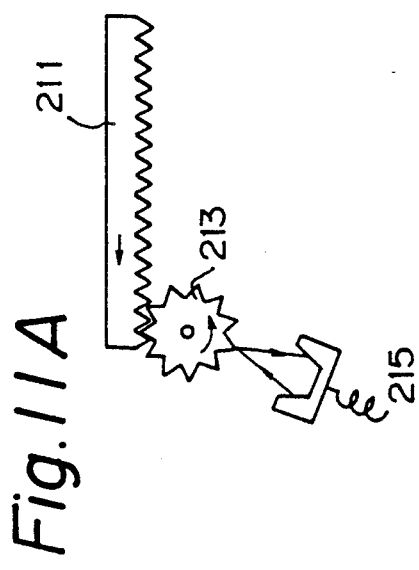
FIGS. 11A and 11B are schematic views of other embodiments of the present invention different from FIG. 5.
Figure 11B:
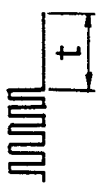

FIGS. 11A and 11B show a modification of FIG. 5. In this modification, the carriage 101 has a rack 211 integral therewith. The machine body 105 has a pinion 213 which is rotatably supported thereon to mesh with the rack 211. The pinion 213 functions as an encoder, so that the teeth of the pinion 213 are detected by a reflection type of photodetector 215 to detect the completion of the tool retraction. Namely, during cutting, the number of the pulses corresponding to the number of teeth of the pinion 213 are output at a constant pitch, as shown in FIG. 11B. On the other hand, since the carriage 101, and accordingly the rack 211, stop moving at the end of the cutting operation, the pulse is interrupted. The motor M is stopped at a predetermined time t (e.g., t=3 sec.) after the interruption of the pulse. It should be appreciated that, since the movement of the carriage 101, and accordingly the rack 211, are relatively slow, it is possible to provide a gear train (not shown) to increase the rotational speed between the rack 211 and the pinion 213 or between the pinion 213 and the photodetector 215. Note that a photodetector having a pair of a photo-emitter and a photo-receiver similar to the photodetector shown in FIG. 5 can be provided on the opposite sides of the pinion 213, instead of the reflection type photodetector 215.

Figure 6:
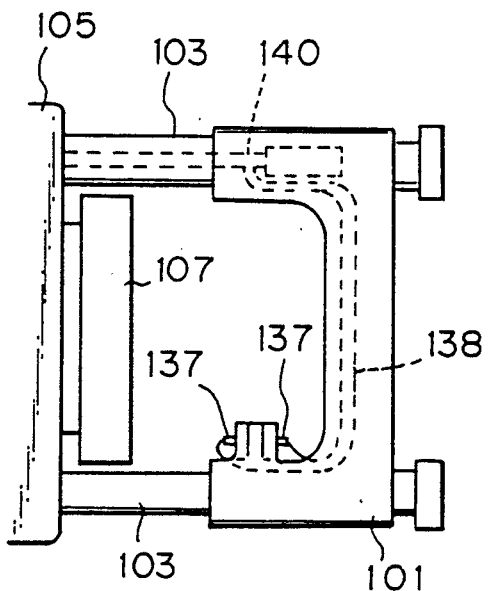
FIGS. 6 and 7 are front elevational view and plan view of a detecting means for discriminating the kinds of the cutting operations according to an embodiment, respectively.
Figure 7:
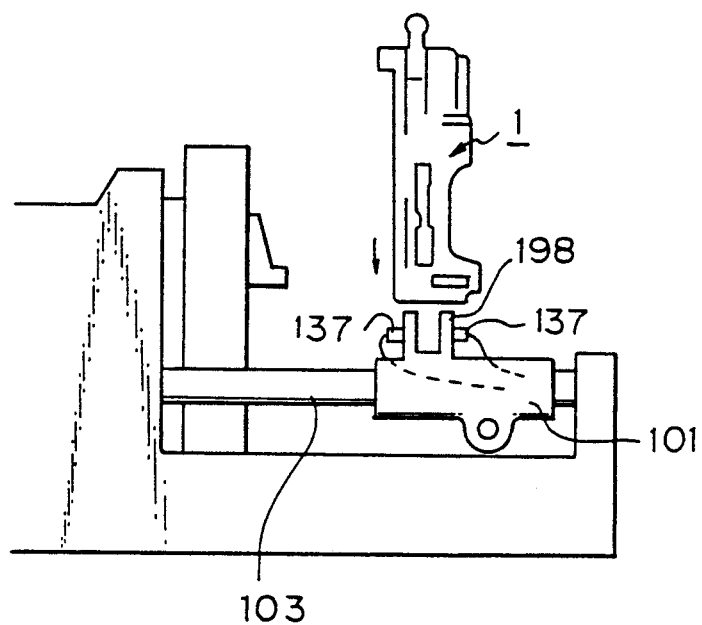

FIG. 6 and 7 show an example of means for discriminating the kind of cutting operation.

Figure 13:
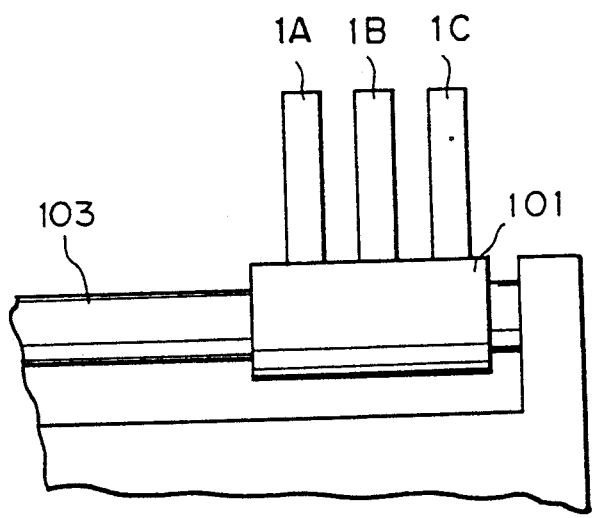

Usually, a plurality of die heads 1A, 1B, and 1C, etc., for performing different cutting operations, such as thread cutting, reaming or cutting, are provided on a carriage 101 of a cutting machine, as in FIG. 13. Each die head is rotatably mounted to the carriage 101 through respective mounting shafts 50 (FIG. 8), between operative positions and inoperative positions, similar to the die head 1 mentioned above. The die heads which are not in use are located in the inoperative positions so as not to interfere with the intended cutting operation.

To operate the automatic operation stopping device according to the present invention only for the thread cutting operation, the thread cutting head brought to the operative position (working position) can be detected. Namely, to this end, the side (a boss 52 in FIG. 8) of the thread cutting die head 1 far from the mounting shaft 50 is detected when the side (boss 52) is located in a forked flange portion 198 which is formed on the carriage 101. For this detection, a photodetector 137 (FIGS. 1 and 7) similar to the photodetector shown in FIG. 5 is provided on the forked flange portion 198. The optical signal of the photodetector 137 is converted to an electrical signal by the photoelectric converter 135 to control the second transistor 133. In FIG. 1, the first and second transistors 127 and 133 are connected to each other in series, and accordingly, the automatic operation stopping circuit is activated only when the second transistor 133 is made ON. Namely, the automatic operation stopping circuit can function only in the case of thread cutting (the automatic operations stopping circuit is unnecessary for cutting and reaming).

FIG. 6 is a plan view showing an arrangement of an optical fiber 138 of the photodetector 137 by way of an example. For clarification, the die head is removed in the drawing. In FIG. 6, the optical fiber 138 extends below the carriage 101 to pass through an existing lubricating oil pipe 140 and is connected to the automatic operation stopping circuit provided in the machine body 105. Usually, the oil pipe 140 is provided in one of the parallel guide rods 103.

In FIG. 1, it is also possible to make the resetting switch S₂ of the flip-flop 129 independent from the power switch $S_M$ in the switch box 111, so that an operator can reset the switch S2 independently of the operation of the power switch $S_M$. Similarly, it is possible to provide selection switches, the number of which corresponds to the kind of cutting operation, in the switch box 111, so that an operator can selectively and manually operate the selection switches. In this alternative, the selection switches are arranged, for example, in the driving circuit of the flip-flop 129 and the above-mentioned photodetector can be omitted.

It will be understood that, if the ON state of the microswitch S₁ is held after being made ON by the dog of the tool retracting lever, the flip-flop in FIG. 1 can be omitted.

As a means for indirectly detecting the tool retraction, a change in the drive current can be used. Namely, since the load is sharply reduced when the cutting tools are retracted at the end of cutting, the value of the electric current is rapidly lowered. Therefore, the change in the electric current can be utilized as a breaking signal for the motor drive circuit.

Figure 12:
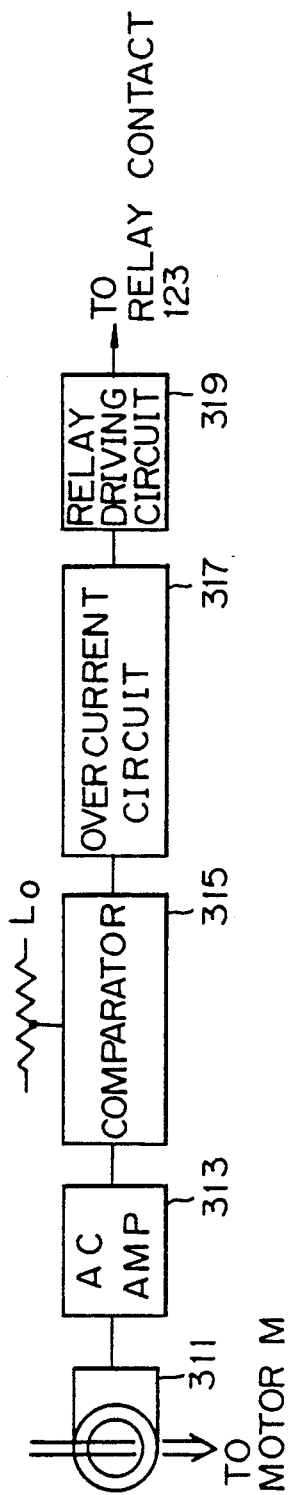
FIG. 12 is a block diagram of an automatic operation stopping circuit according to another embodiment of the present invention; and, FIG. 13 is a schematic side elevational view showing different kinds of die heads carried on a same carriage, according to an embodiments of the present invention.

FIG. 12 shows an example of a means for detecting the change of the electric current. In FIG. 12, the current of the motor M, which is detected by a current sensor 311 such as a current transformer CT, is amplified by an AC amplifier 313 and then fed to a comparator 315. In the comparator 315, the electric current under a no load condition (or a maximum current at the thread cutting) is set as a set level $L_O$. When the detected current is equal to the set level $L_O$ (or exceeds the set level $L_O$), an overcurrent circuit 317 is made ON, so that the above-mentioned drive circuit 319 of the relay 124 is made ON to open the relay contact 123, thus resulting in a stoppage of the motor M.

As can be understood from the above description, according to the present invention, in a cutting machine having an automatic tool retracting means, the spindle drive motor can be automatically stopped simultaneously with the completion of the tool retraction, and accordingly, it is unnecessary for an operator to stand by the machine, resulting in a reduced labor cost, a safer operation, and a decreased electric power consumption.

We claim:

1. In a cutting machine having an electrically driven spindle drive motor, a die head which holds at least one cutting tool, and an automatic tool retracting means on the die head for detecting the completion of the cutting operation of an object to be cut by the cutting tool to automatically retract the cutting tool to its initial inoperative position, the improvement comprising an automatic operation stopping apparatus which comprises a detecting means for detecting the operation of the automatic tool retracting means and a switch means for automatically breaking the electrical connection of the spindle drive motor in response to the detection signal of the detecting means.

2. An automatic operation stopping apparatus according to claim 1, wherein said detecting means comprises a photodetector.

3. An automatic operation stopping apparatus according to claim 1, wherein said detecting means comprises a microswitch actuated by the tool retracting means.

4. An automatic operation stopping apparatus according to claim 1, wherein said tool retracting means comprises a tool retracting lever which is moved by the object to be cut at the end of the cutting operation.

5. An automatic operation stopping apparatus according to claim 3, wherein said detecting means comprises a dog provided on the die head for actuating the microswitch.

6. An automatic operation stopping apparatus according to claim 1, wherein said switching means comprises a relay which has a normally closed relay contact and a relay coil for driving the relay contact and which is controlled by the detection signal of the detecting means.

7. An automatic operation stopping apparatus according to claim 3, further comprising a flip-flop for holding an ON state of the microswitch.

8. An automatic operation stopping apparatus according to claim 1, further comprising means for detecting the change of the electric current of the spindle drive motor.

9. In a cutting machine having an electrically driven spindle drive motor, a die head which holds at least one cutting tool, a movable carriage which rotatably holds the die head, and an automatic tool retracting means on a predetermined die head for detecting the completion of the cutting operation of an object to be cut by the cutting tool to automatically retract the cutting tool to its initial inoperative position, the improvement comprising an automatic operation stopping apparatus which comprises a detecting means for detecting the operation of the automatic tool retracting means, said detecting means comprising a rack provided on the carriage and a pinion provided on the cutting machine body to mesh with the rack and means for detecting the number of teeth of the pinion, and a switch means for automatically breaking the electrical connection of the spindle drive motor in response to the detection signal of the detecting means.

10. In a cutting machine having an electrically driven spindle drive motor, different kinds of die heads each holding at least one cutting tool and movable between an inoperative position in which the cutting tool of the associated die heads do not interfere with an object to be cut held by the cutting machine and an operative position in which the cutting tools of the associated die heads are in use, a movable carriage which rotatably holds the die heads, and an automatic tool retracting means on a predetermined die head for detecting the completion of the cutting operation of the object to be cut to automatically retract the cutting tool of the associated die head to its initial inoperative position, the improvement comprising an automatic operation stopping apparatus which comprises a detecting means for detecting the operation of the automatic tool retracting means, a switch means for automatically breaking the electrical connection of the spindle drive motor in response to the detection signal of the detecting means, and means for discriminating the kind of die heads in use.

11. An automatic operation stopping apparatus according to claim 10, further comprising means for selectively activating the automatic operation stopping apparatus only when the predetermined die head is brought to the operative position.

* * * * *

UNITED STATES PATENT AND TRADEMARK OFFICE
CERTIFICATE OF CORRECTION

PATENT NO. : 5,002,440

DATED : March 26, 1991

INVENTOR(S) : Tamaoki et al.

It is certified that error appears in the above-identified patent and that said Letters Patent is hereby corrected as shown below:

COLUMN 7, LINE 5,
DELETE "150," and INSERT therefor --150'--

COLUMN 8, LINE 49,
DELETE "S2" and INSERT therefor --$S_2$--

Signed and Sealed this

Third Day of November, 1992

Attest:

DOUGLAS B. COMER

*Attesting Officer*  *Acting Commissioner of Patents and Trademarks*